United States Patent
Sakuma (10) Patent No.: US 7,349,771 B2
(45) Date of Patent: Mar. 25, 2008

(54) ROAD SHAPE RECOGNITION APPARATUS (75) Inventor: Yasushi Sakuma, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/478,515

(22) Filed: Jun. 29, 2006

(65) Prior Publication Data
US 2007/0010937 A1 Jan. 11, 2007

(30) Foreign Application Priority Data
Jul. 8, 2005 (JP) ............... 2005-200345

(51) Int. Cl.
G05D 1/00 (2006.01)
B60T 7/16 (2006.01)

(52) U.S. Cl. ............... 701/1; 180/169; 340/436

(58) Field of Classification Search ............... 342/70; 701/1; 180/169; 340/438
See application file for complete search history.

(56) References Cited

U.S. PATENT DOCUMENTS 6,317,073 B1  11/2001  Tamatsu et al.
6,553,283 B2   4/2003  Shirai et al.
6,812,882 B2* 11/2004  Ono ............... 342/70
2001/0025211 A1* 9/2001  Shirai et al. ....... 701/1
2003/0076255 A1* 4/2003  Ono ............... 342/70

* cited by examiner

Primary Examiner—Mark Hellner
(74) Attorney, Agent, or Firm—Harness, Dickey & Pierce, PLC (57) ABSTRACT A front radar recognizes a still object. A process generates a still object map that shows a relative position between the still object and a subject vehicle. The process groups still objects in the still object map. In terms of each individual still object group, the process selects a left or right evaluation map depending on whether the still object group is positioned to the left or right side of a road. The process defines an additive value for the still object group based on the distance between the vehicle and the still object group and based on the vehicle speed. The process adds the still object group's additive value to the selected evaluation map. The process subtracts a subtractive value from part of the evaluation map where no values are added. The process recognizes a road shape based on the evaluation map.

9 Claims, 5 Drawing Sheets

ROAD SHAPE RECOGNITION APPARATUS

CROSS REFERENCE TO RELATED APPLICATIONS

This application is based on and incorporates herein by reference Japanese Patent Application No. 2005-200345 filed on Jul. 8, 2005.

FIELD OF THE INVENTION

The present invention relates to a road shape recognition apparatus to recognize a road shape along a vehicle traveling direction based on information obtained from an in-vehicle radar apparatus, which radiates a radar wave as a transmission wave at a specified interval and detects an object based on a reflected wave.

BACKGROUND OF THE INVENTION

Conventionally, there is known an in-vehicle radar apparatus that radiates a radar wave (e.g., laser wave, millimeter wave, and the like) as a transmission wave at a specified interval across a specified angle around a vehicle. The in-vehicle radar apparatus receives a reflected wave to detect an object around the vehicle.

This type of in-vehicle radar apparatus is applied to so-called automatic cruise control. That is, the in-vehicle radar apparatus detects whether or not an obstacle exists in the vehicle's traveling direction. When an obstacle is found, the in-vehicle radar apparatus provides control to generate an alarm for a driver. The in-vehicle radar apparatus mounted in a vehicle detects a vehicle (preceding vehicle) that is located ahead of the vehicle and travels along the same lane as for the vehicle. In this manner, the in-vehicle radar apparatus controls the vehicle speed so as to keep a constant distance to the preceding vehicle.

An objective is to specify the preceding vehicle among various objects recognized based on the radar wave. To achieve this, it is necessary to highly accurately recognize a road shape ahead of the vehicle.

Figure 8:
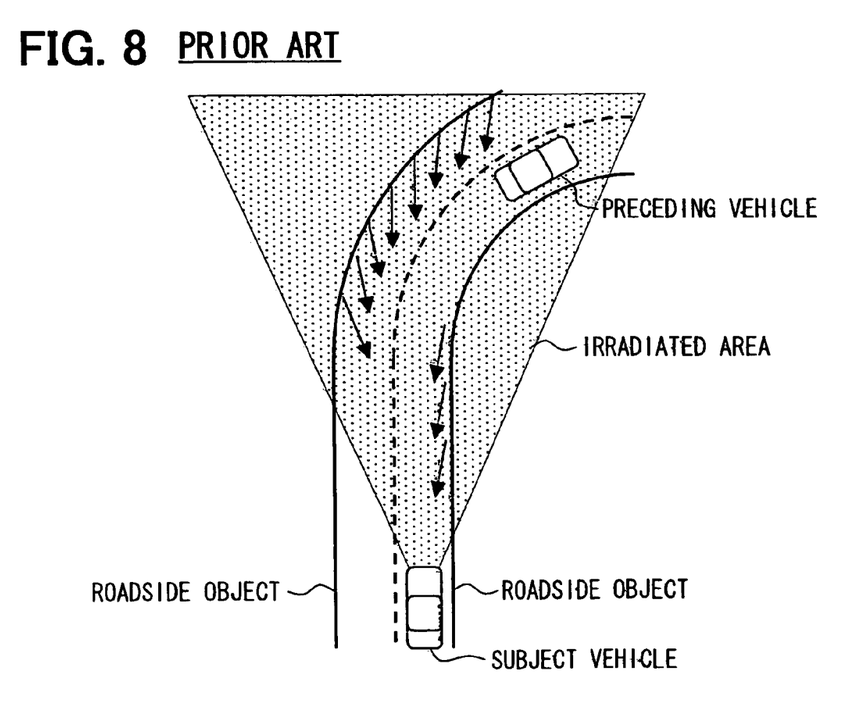
FIG. 8 shows the principle of road shape recognition in a prior art.

There is known an apparatus that recognizes a road shape (e.g., see patent document 1). As shown in FIG. 8, the apparatus extracts a roadside object (e.g., acoustic insulation barrier or guard rail) from various recognized objects. The apparatus calculates an approximate curve that represents a disposition state of the extracted roadside object to estimate the road shape.

However, the apparatus described in patent document 1 newly recalculates a disposition state of the roadside object only based on a detection result from a one-time operation of the radar apparatus each time it operates. When the roadside object is incorrectly detected due to a sporadic noise and the like, the road shape recognition is greatly influenced.

Patent document 1: JP-2001-256600 A

SUMMARY OF THE INVENTION

It is an object of the present invention to provide a road shape recognition apparatus capable of always highly accurately recognizing a road shape even when a roadside object is incorrectly detected.

According to an aspect of the present invention, a road shape recognition apparatus for a vehicle is provided with the following. Still object map generation means is included for repeatedly generating a still object map indicating a relative position of a still object with respect to the vehicle by extracting the still object based on information indicative of a position and a speed of an object detected by a radar means. Evaluation value setup means is included for, each time the still object map is generated, providing each unit region, which results from segmentalizing the still object map, with an evaluation value being positive for a unit region containing a still object and being negative for a unit region not containing a still object. Evaluation map creation means is included for accumulating an evaluation value provided to each unit region in the still object map that is repeatedly generated, to create an evaluation map such that a unit region indicating high possibility of presence of the still object contains a large evaluation value. Road shape recognition means is included for recognizing a road shape based on an evaluation map created by the evaluation map creation means.

A still object map is generated each time radar means operates. An evaluation map smoothes the still object map for each unit region along the time axis. The evaluation map reflects information about still objects that were detected in the past.

Even when the generated still object map contains an error for some reason, the evaluation map smoothes to suppress the influence of the incorrect information. The evaluation map is not greatly affected unless the same unit region is subject to successive errors.

As a result, the road shape recognition apparatus according to the invention can always highly accurately recognize a road shape even when a sporadic noise or the like causes incorrect detection in the radar means and the incorrect detection generates the still object map containing an error.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Embodiments of the present invention will be described in further detail.

Figure 1:
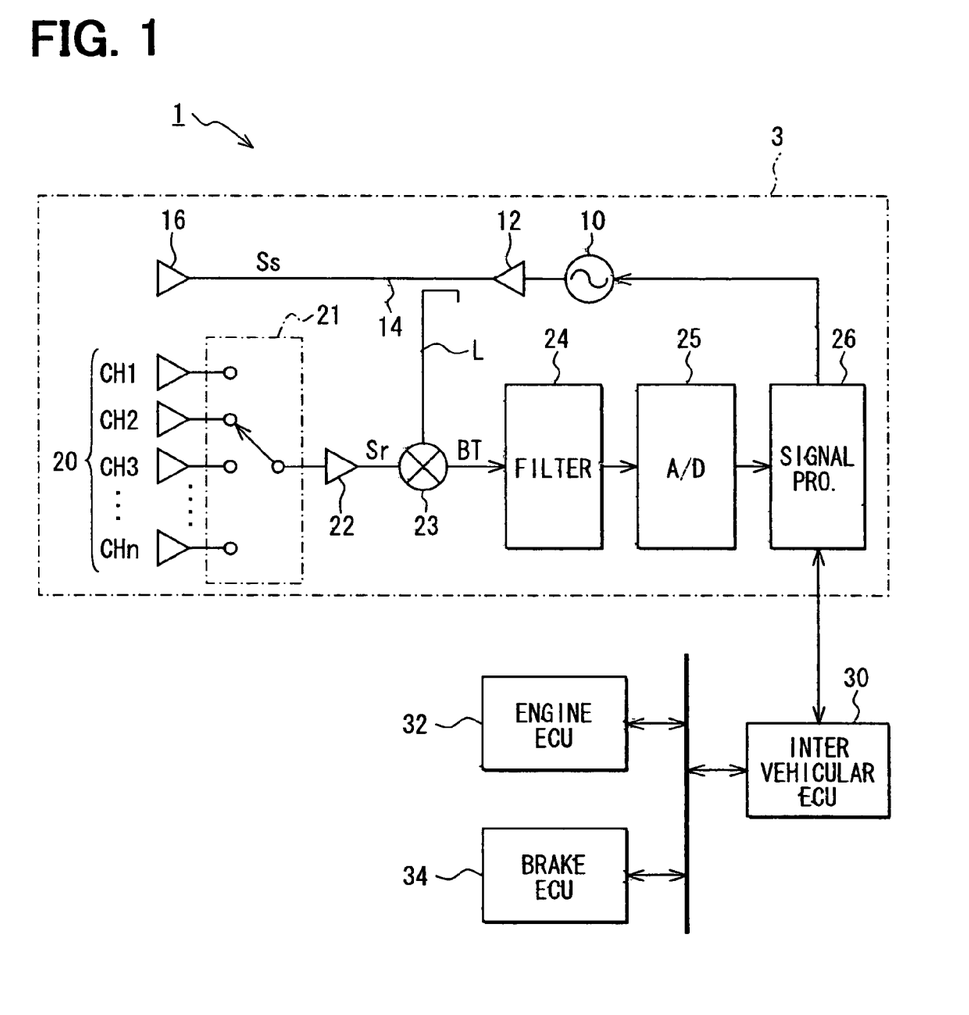
FIG. 1 is a block diagram showing a schematic construction of a vehicle control system.

FIG. 1 is a block diagram showing a schematic construction of a vehicle control system 1 according to the invention.

As shown in FIG. 1, the vehicle control system 1 mounted in a vehicle (hereinafter also called "subject vehicle") is equipped with a front radar 3. The front radar 3 is provided at the front of the vehicle and detects objects (preceding vehicle, roadside object, obstacle, and the like) located within a specified detection range ahead of the vehicle. The front radar 3 is connected to an intervehicular controlling electronic control unit (hereinafter referred to as an intervehicular controlling ECU) 30. The intervehicular controlling ECU 30 is connected to various ECUs such as an engine electronic control unit (hereinafter referred to as an engine ECU) 32 and a brake electronic control unit (hereinafter referred to as a brake ECU) 34 via a LAN (Local Area Network) communication bus. Each ECU is mainly composed of a known computer and includes a bus controller that implements communication via a LAN communication bus.

The front radar 3 is constructed as a so-called FMCW-based (Frequency Modulated Continuous Wave-based) millimeter wave radar. The front radar 3 transmits and receives radar waves in the frequency-modulated millimeter waveband to recognize objects such as a vehicle, a roadside object, and a road shape. Based on these recognition results, the front radar 3 creates target information about a preceding vehicle running ahead of the subject vehicle and transmits the target information to the intervehicular controlling ECU 30. The target information includes at least a relative speed and a position (distance and direction) with respect to the preceding vehicle. Thus, the front radar 3 functions as a radar, a road shape recognition apparatus, or the like; operations of the road shape recognition apparatus will be explained later in detail.

The brake ECU 34 transmits a brake pedal state to the intervehicular controlling ECU 30. The brake ECU 34 determines the brake pedal state based on detection information (steering angle and yaw rate) from a steering sensor and a yaw rate sensor (not shown) and based on information from an M/C pressure sensor (not shown). The brake ECU 34 receives target acceleration, brake request, and the like from the intervehicular controlling ECU 30. The brake ECU 34 uses the received information and determined brake state to drive a brake actuator and control a brake force. The brake actuator turns on and off a pressure-rising valve and a pressure-reducing valve installed in a hydraulic braking circuit.

The engine ECU 32 transmits detection information (vehicle speed, engine control state, and accelerator operation state) from a vehicle speed sensor, a throttle angle sensor, and an accelerator pedal angle sensor (not shown) to the intervehicular controlling ECU 30. The engine ECU 32 receives target acceleration, fuel cut request, and the like from the intervehicular controlling ECU 30. The engine ECU 32 responds to an operation state specified by the received information and outputs a drive instruction to a throttle actuator that adjusts a throttle angle for an internal combustion engine. In this manner, the internal combustion engine's driving force is controlled.

The intervehicular controlling ECU 30 receives target information from the front radar 3, a vehicle speed and an engine control state from the engine ECU 32, and a steering angle, a yaw rate, a brake control state, and the like from the brake ECU 34. The intervehicular controlling ECU 30 uses values supplied from a cruise control switch and a target distance setup switch (not shown), and target information received from the front radar 3 to provide control instructions for appropriately adjusting a distance to the preceding vehicle. That is, the intervehicular controlling ECU 30 transmits target acceleration, fuel cut request, and the like to the engine ECU 32. The intervehicular controlling ECU 30 transmits target acceleration, brake request, and the like to the brake ECU 34.

The front radar 3 will be described in detail. The front radar 3 includes an oscillator 10, an amplifier 12, a distributor 14, a transmission antenna 16, and a reception antenna unit 20. The oscillator 10 generates a high-frequency signal in millimeter waveband. The high-frequency signal is modulated so as to include a rising period and a falling period. As the time elapses, the frequency linearly increases in the rising period and linearly decreases in the falling period. The amplifier 12 amplifies a high-frequency signal generated by the oscillator 10. The distributor 14 distributes the power output from the amplifier into transmission signal Ss and local signal L. The transmission antenna 16 radiates a radar wave corresponding to the transmission signal Ss. The reception antenna unit 20 includes as many as n reception antennas to receive radar waves.

The front radar 3 further includes a reception switch 21, an amplifier 22, a mixer 23, a filter 24, an A/D converter 25, and a signal processing unit 26. The reception switch 21 sequentially selects the antennas constituting the reception antenna unit 20 and supplies subsequent components with reception signal Sr from the selected antenna. The amplifier 22 amplifies the reception signal Sr supplied from the reception switch 21. The mixer 23 mixes the reception signal Sr amplified in the amplifier 22 with the local signal L to generate beat signal BT. The filter removes unnecessary signal components from the beat signal generated by the mixer 23. The A/D converter 25 samples an output from the filter 24 and converts it into digital data. The signal processing unit 26 starts or stops the oscillator 10 and controls sampling of the beat signal BT via the A/D converter 25. The signal processing unit 26 uses the sampling data for signal processing and communicates with the intervehicular controlling ECU 30. The signal processing unit 26 transmits and receives information (vehicle speed information) needed for the signal processing and information (target information and the like) obtained as a result of the signal processing.

Each of the antennas constituting the reception antenna unit 20 is so configured that its beam width covers the entire beam width of the transmission antenna 16. The antennas are assigned to CH1 through CHn.

The signal processing unit 26 is mainly composed of a known computer having at least a CPU, ROM, and RAM. The signal processing unit 26 further includes an arithmetic processing unit (e.g., DSP) that performs the fast Fourier transform (FFT) process and the like for data supplied via the A/D converter 25. The RAM constituting the signal processing unit 26 is provided with a storage area for storing a still object map and evaluation maps (left and right evaluation maps) to be described later.

The front radar 3 according to the embodiment is constructed as mentioned above. In the front radar 3, the oscillator 10 starts in accordance with an instruction from the signal processing unit 26. The oscillator 10 generates a high-frequency signal. The amplifier 12 amplifies the high-frequency signal. The distributor 14 distributes the high-frequency signal as power to generate the transmission signal Ss and the local signal L. The transmission signal Ss is transmitted as a radar wave via the transmission antenna 16.

The radar wave is transmitted from the transmission antenna 16 and returns as a reflected wave. All the reception antennas constituting the reception antenna unit 20 receive the reflected wave. The amplifier 22 amplifies the reception signal Sr corresponding to the reception channel CHi (i=1 through n) selected by the reception switch 21. The amplified reception signal Sr is supplied to the mixer 23. The mixer 23 mixes the reception signal Sr with the local signal L from the distributor 14 to generate the beat signal BT. The filter removes unnecessary signal components from the beat signal BT. The A/D converter 25 then samples the beat signal BT and supplies it to the signal processing unit 26.

The reception switch 21 is operated so that all the channels CH1 through CHn are selected for a specified number of times (e.g., 512 times) during one modulation cycle of the radar wave. The A/D converter 25 samples data in synchronization with the switch timing. That is, within one modulation cycle of the radar wave, sampled data are stored for each of the channels CH1 to CHn and each of the radar wave rising and falling sections.

The signal processing unit 26 in the front radar 3 performs a signal analysis process and a target information generation process. Each time one modulation cycle passes, the signal analysis process applies an FFT process to sampling data stored during that cycle for each of the channels CH1 through CHn and for each of the rising and falling sections. In accordance with an analysis result of the signal analysis process, the target information generation process detects a preceding vehicle and generates target information.

The signal analysis process is a known technology and a description is omitted here.

Figure 2:
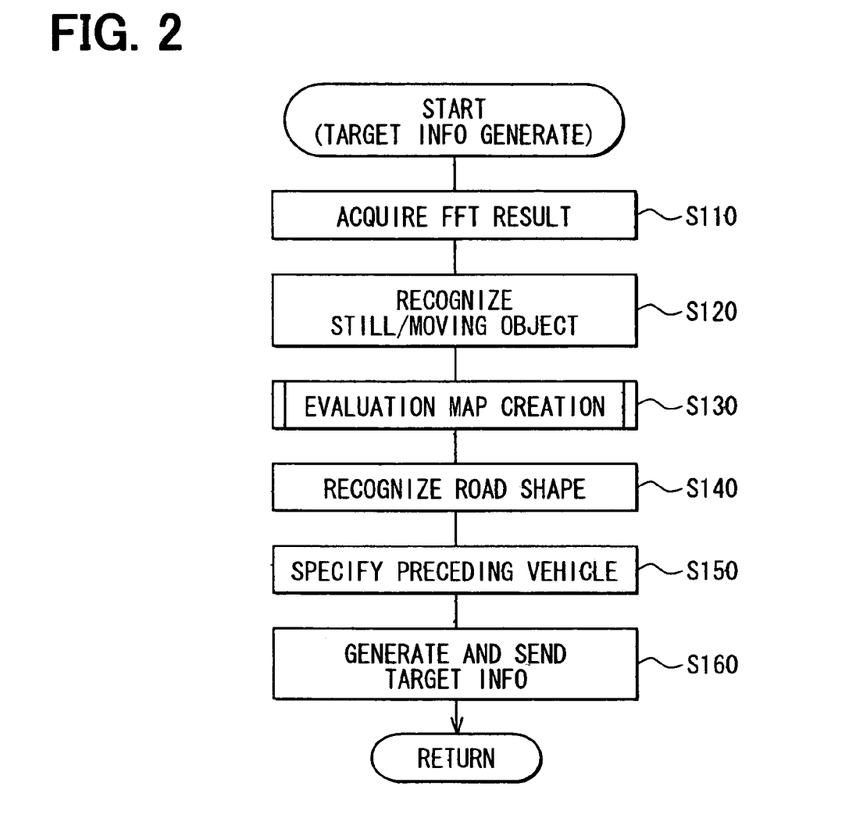
FIG. 2 is a flowchart showing a target information generation process performed by a signal processing unit.
Figure 3:
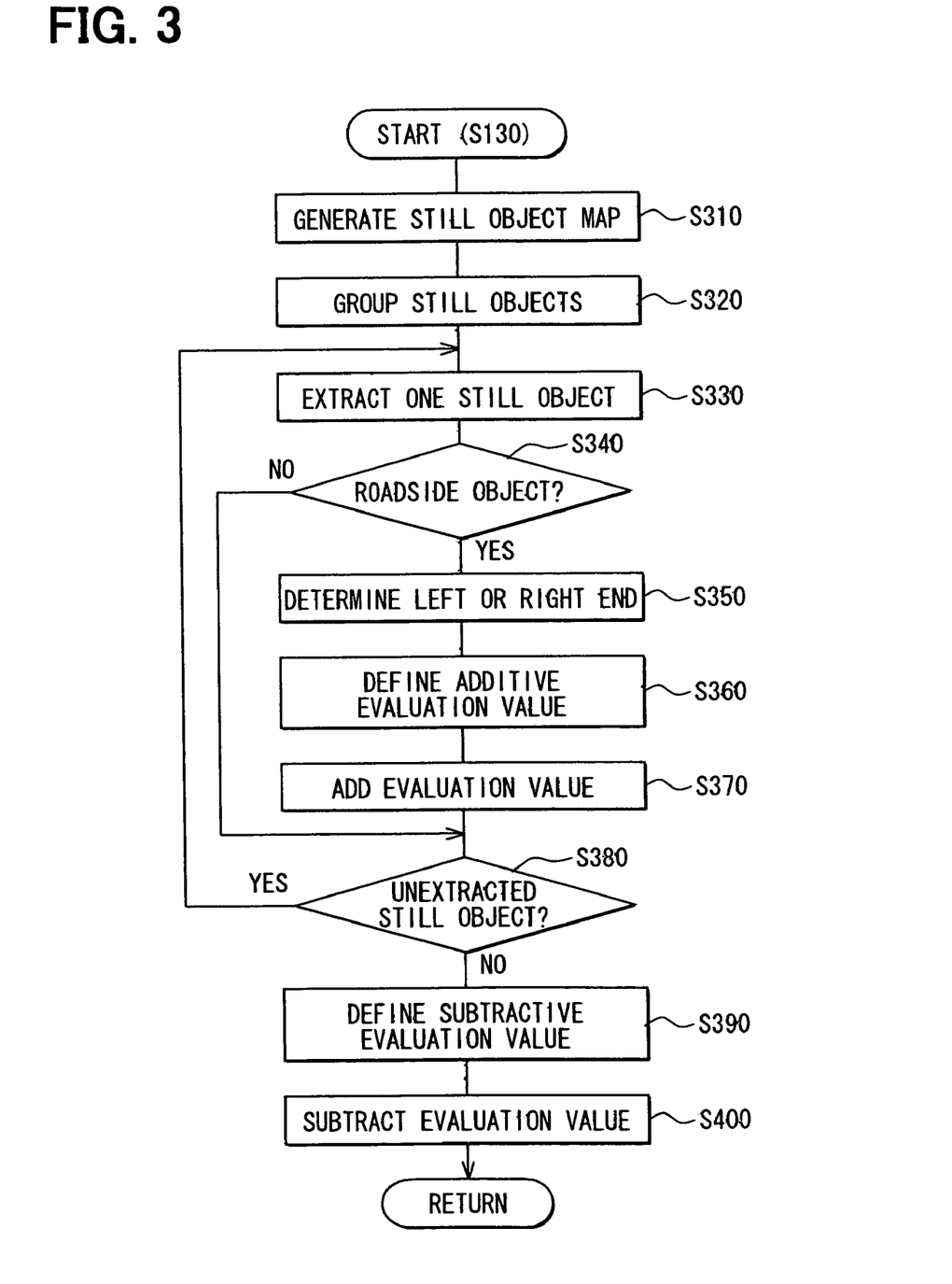
FIG. 3 is a flowchart showing an evaluation map creation process executed in the target information generation process.

With reference to the flowcharts in FIGS. 2 and 3, the following describes target information generation process in detail. The signal analysis process initiates the target information generation process each time an FFT process result is calculated based on sampling data for one modulation cycle.

At Step S110 in FIG. 2, the process starts to acquire an FFT result from the signal analysis process. At Step S120, the process performs an object recognition process for recognizing an object based on the acquired FFT process result.

The object recognition process first extracts a peak frequency for the beat signal for each of the rising and falling sections from the FFT process result. The object recognition process specifies a peak frequency to be paired to detect an object based on a history of object detection results (object positions and speeds), for example. The object recognition process finds a speed or a distance relative to the detected object. The object recognition process recognizes the detected object to be a moving object or a still object. A given difference is defined to be between (i) the absolute value of the subject vehicle speed and (ii) the absolute value of a relative speed between the subject vehicle and the object. When the given difference is greater than or equal to a predetermined movement determination value, the detected object is recognized to be a moving object. When the given difference is smaller than the movement determination value, the detected object is recognized to be a still object.

In addition, the process uses information about a phase difference between signal components having the same peak frequency acquired from the channels CH1 through CHn and calculates a direction indicating the existence of the object specified by that peak frequency. Specifically, the digital beam forming technique may be used to calculate the object direction, for example. Further, it may be preferable to use the following technique. That is, the technique generates a reception vector from an FFT process result of the channels CH1 through CHn. The technique finds a specific value for a correlation matrix generated from the reception vector. The technique generates an angle spectrum (e.g., MUSIC spectrum) based on that specific value.

At Step S130, the process performs the evaluation map creation process based on the object that is recognized to be a still object at Step S120.

The evaluation map creation process will be described in detail with reference to the flowchart in FIG. 3.

At Step S310 in FIG. 3, the process starts to generate a still object map based on the still object recognized at Step S120. At Step S320, the process groups still objects indicated in the still object map based on still object sizes and distances between still objects. The objects belonging to the same group have the sizes and the distances that satisfy the regularity attributed to roadside objects arranged on one side of the road.

Figure 4:
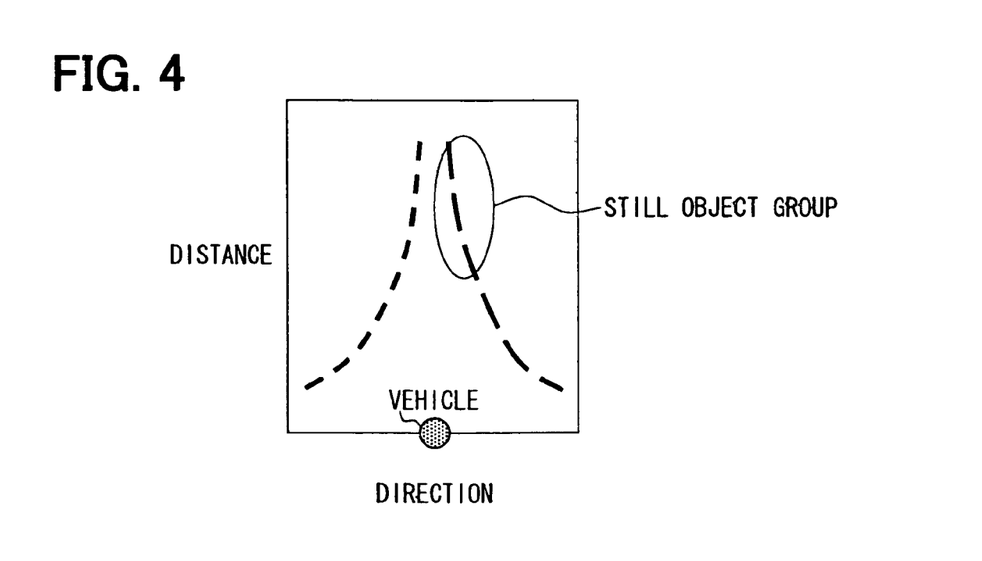
FIG. 4 outlines a still object map.

As shown in FIG. 4, the still object map represents a still object viewed from the subject vehicle and a relative position of the still object group using the direction viewed from the subject vehicle and a distance between the still object and the subject vehicle (i.e., polar coordinates). The still object map is segmentalized into a lattice according to a unit distance and a unit angle determined by resolutions of distances and directions acquired by the object recognition process at Step S120. The still object map is constructed to represent the presence or absence of a still object in binary correspondingly to each of the segmentalized regions (hereinafter referred to as unit regions).

The still object map in FIG. 4 shows that roadside objects at both ends of the road are recognized as still objects and the still object grouping is complete. In the still object map, a curved line extends in the direction along which the distance increases from both sides of the subject vehicle position. The curved line represents an array (i.e., a still object group) of still objects (roadside objects). An area between curved lines represents the road.

At Step S330, the process extracts one still object group from the still object map. At Step S340, the process determines whether or not the extracted still object group (hereinafter referred to as a target still object group) is a roadside object.

Specifically, exclusive conditions are provided. For example, one exclusive condition may specify that the width (the length in the width direction of the subject vehicle) of a target still object group exceeds a predetermined threshold value (e.g., 1.2 m). Another exclusive condition may specify that a target still object group is located near (e.g., within 2 m from the center of) the moving object recognized at Step S120. When the target still object group satisfies any of these exclusive conditions, the process determines the target still object group to be an object (such as a road sign (signboard) and a vehicle) other than a roadside object, i.e., not a roadside object. When the target still object group corresponds to none of the exclusive conditions, the process determines the target still object group to be a roadside object.

When the target still object group is not determined to be a roadside object at Step S340, the process proceeds to Step S380 without performing Steps S350 through S370 to follow. When the target still object group is determined to be a roadside object at Step S340, the process determines at Step S350 whether the target still object group constitutes the left end or the right end of the road. When the target still object group is determined to be a roadside object constituting the left end of the road, the process selects the left evaluation map. When the target still object group is determined to be a roadside object constituting the right end of the road, the process selects the right evaluation map.

The process determines whether the still object group constitutes the left end or the right end of the road specifically in consideration for the continuity with the other still object group determined to be composed of roadside objects.

Figure 5:
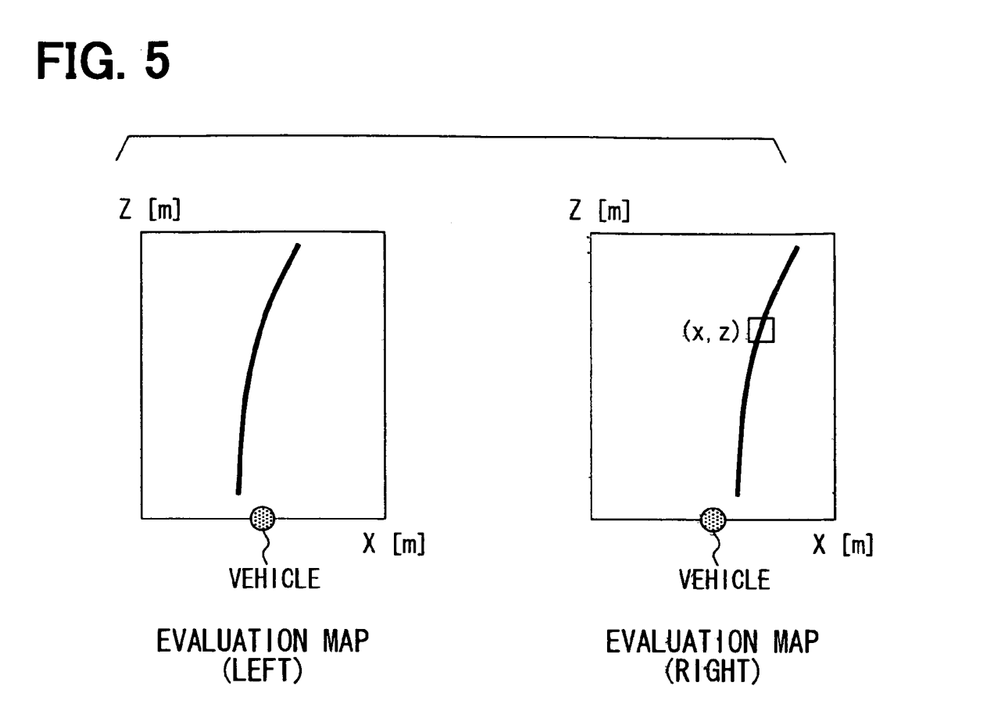
FIG. 5 outlines an evaluation map.

As shown in FIG. 5, the evaluation map represents a relative position of the still object (roadside object) viewed from the subject vehicle using coordinates based on the subject vehicle position as an origin. The left evaluation map is used to represent only roadside objects at the left end of the road. The right evaluation map is used to represent only roadside objects at the right end of the road.

Similarly to the still object map, the evaluation map is segmentalized into a lattice according to a predetermined unit distance. Each of the segmentalized unit regions is associated with a unit region in the still object map. A known coordinate conversion can be used to easily associate each unit region in the still object map based on polar coordinates with each unit region in the evaluation map based on coordinates.

At Step S360, the process defines an evaluation value (additive value) to be assigned to a unit region (hereinafter also referred to as an addition-targeted unit region) corresponding to the position of the target still object group. At Step S370, the process adds the defined evaluation value to the right or left evaluation map selected at Step S350.

The evaluation value signifies an index to evaluate the possibility of existence of a roadside object. The evaluation value is defined based on a speed of the subject vehicle and a distance from the subject vehicle to the addition-targeted unit region. A large evaluation value is defined for an addition-targeted unit region that is located far from the subject vehicle. In general, a large evaluation value is defined for a high vehicle speed independently of positions of addition-targeted regions.

At Step S380, the process determines whether or not the still object map contains an unextracted still object group. When an unextracted still object group is found, the process returns to Step S330. The process is repeated from Steps S330 to S370 until there remains no unextracted still object group.

When it is determined at Step S380 that there is no unextracted still object group, the process proceeds to Step S390 to define an evaluation value (subtractive value) for each of the right and left evaluation maps. The defined evaluation value is applied to a unit region (also referred to as a subtraction-targeted unit region) that is excluded from addition-targeted unit regions. At Step S400, the process subtracts the defined evaluation value from the right and left evaluation maps and then terminates.

The evaluation map accumulates evaluation values for each unit region. The evaluation values are provided with an upper bound VU and a lower bound VL. At Steps S360 and S390, the process defines an evaluation value (additive value or subtractive value) smaller than a difference VU−VL.

Specifically, there may be a situation where the information in the still object map needs to be reflected on the evaluation map with good response. In such situation, the evaluation value is sized so that the accumulated evaluation value reaches the upper bound (or lower bound) just after accumulating additive values (or subtractive values) in the same unit region once or up to three times successively, for example. In the other situations, the evaluation value is sized so that the accumulated evaluation value reaches the upper bound (or lower bound) after accumulating additive values (or subtractive values) in the same unit region four to ten times successively, for example.

Figure 6:
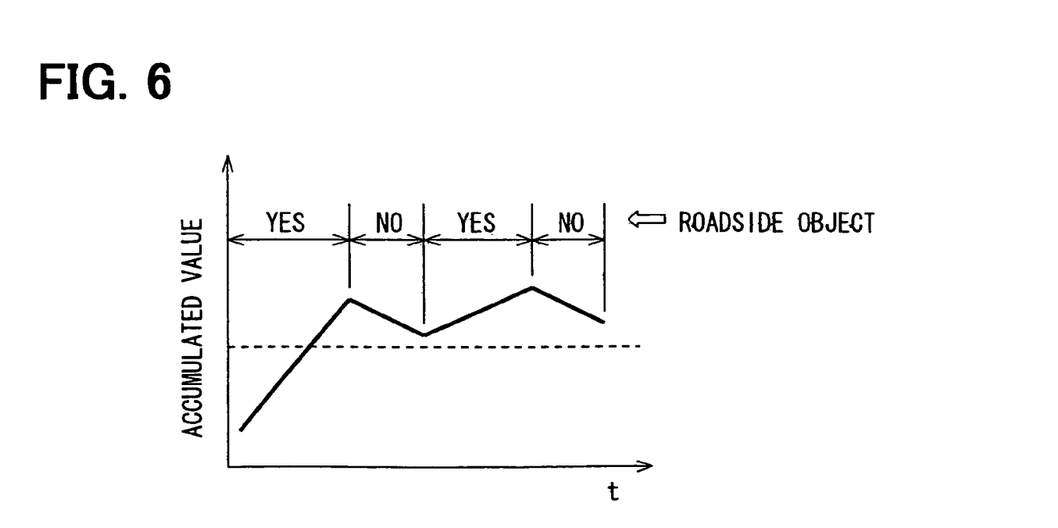
FIG. 6 shows how accumulated evaluation values change.

FIG. 6 is a graph showing how accumulated evaluation values (additive values or subtractive values) change with time in a given unit region. As seen from FIG. 6, accumulated evaluation values do not immediately disappear even when the position (unit region) to detect a still object changes. The evaluation map represents positions of still objects (roadside objects) as a spreading distribution, not points or lines. In particular, a large accumulated evaluation value corresponds to a region where a still object highly possibly exists.

When the spreading distribution is used as is, the roadside object position becomes ambiguous. Furthermore, many pieces of information need to be processed, which increases process loads.

To solve this problem, a road shape may be recognized assuming that a roadside object exists in a unit region assigned with an evaluation value greater than or equal to a threshold value for the evaluation map.

At Step S140 in FIG. 2, the process recognizes a road shape based on the left or right evaluation map created at Step S130. That is, the process uses the left evaluation map to find an approximate curve indicating the left end of the road assumed from the position where the roadside object exists. The process uses the right evaluation map to find an approximate curve indicating the right end of the road assumed from the position where the roadside object exists.

It is possible to use known techniques such as the least square and the Hough transform as the method of calculating an approximate curve. The process does not use the whole of the evaluation map created at Step S130. The process uses only part of the evaluation map (unit region) where accumulated evaluation values are greater than a predetermined threshold value, i.e., only part of the evaluation map where the roadside object exists with a given possibility or more.

In the road shape recognition, an approximate curve represents the position of a calculated roadside object. The end of the road may be recognized in terms of the approximate curve itself or the inside of the approximate curve equivalent to a side strip.

At Step S150, the process specifies a vehicle (preceding vehicle) ahead of the subject vehicle based on the recognition result of the moving object at Step S120 and the recognition result of the road shape at Step S140. At Step S160, the process generates target information, i.e., information (relative speed, position (distance, direction), and the like) about the specified preceding vehicle. The process transmits the generated target information to the intervehicular controlling ECU 30 and then terminates.

As mentioned above, the vehicle control system 1 according to the embodiment recognizes a road shape using the evaluation maps (for the left and right ends of a road), not using the still object map that is generated for each modulation cycle of the radar wave. While an evaluation value is defined based on the still object map, the evaluation map is created by accumulating evaluation values for each unit region. The evaluation map reflects the information about still objects that were acquired in the past.

Even when the generated still object map contains an error for some reason, the evaluation map smoothes to suppress the influence of the error. The evaluation map is not greatly affected unless the same unit region is subject to successive errors.

As a result, the vehicle control system 1 can always highly accurately recognize a road shape even when a sporadic noise or the like causes incorrect detection in the front radar 3 and the incorrect detection generates the still object map containing an error.

The vehicle control system 1 groups still objects in the still object map according to whether or not the still objects match the roadside object feature. The vehicle control system 1 determines whether or not the still object is a roadside object for each still object group of grouped still objects.

That is, the vehicle control system 1 determines whether or not the still object is a roadside object in units of still object groups. It is possible to greatly save the trouble of making the determination compared to the case of determining whether or not the still object is a roadside object one by one.

The vehicle control system 1 creates an evaluation map using only the still object group determined to be a roadside object. The vehicle control system 1 creates two types of evaluation maps, i.e., the left and right evaluation maps. The left evaluation map indicates only roadside objects at the left end of the road. The right evaluation map indicates only roadside objects at the right end of the road. The vehicle control system 1 recognizes shapes of the left and right ends of the road independently.

The accuracy of road shape recognition degrades when the evaluation map contains a still object other than the roadside object or a still object positioned at the side different from the intended side. The vehicle control system 1 can help prevent such problem and highly accurately recognize road shapes.

Further, the vehicle control system 1 allocates a large evaluation value defined based on the still object map as a unit region becomes distant from the subject vehicle or the speed of the subject vehicle increases. In other words, the information in each still object map is reflected on the evaluation map with good response in a situation where the still object position greatly changes in the still object map.

Figure 7A:
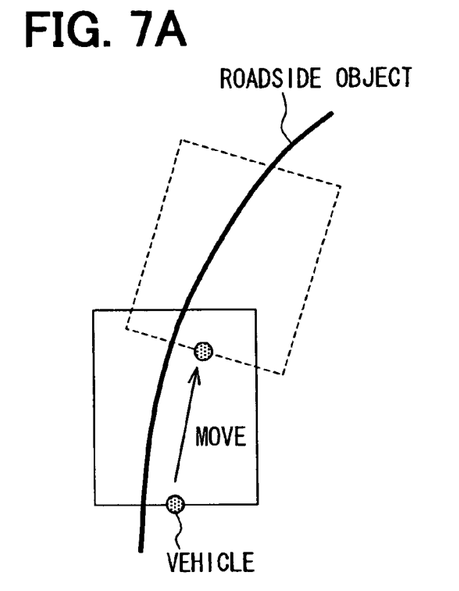
FIGS. 7A and 7B show an effect of accumulating evaluation values on an evaluation map.
Figure 7B:
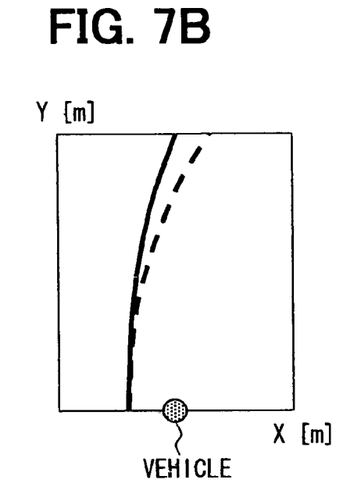

That is, the still object map is repeatedly generated. The still object map momentarily varies as the subject vehicle travels to change its position and direction. The vehicle direction changes especially when the vehicle enters a curved road. In such case, e.g., as shown in FIGS. 7A and 7B, the state of the still object map greatly changes as the distance from the subject vehicle increases. FIG. 7A shows two situations around the subject vehicle at the first point and the second point for generating still object maps, respectively. FIG. 7B shows the still object maps generated at the two points indicated in FIG. 7A so that they overlap with each other.

As a whole, the still object map greatly changes as the subject vehicle speed increases. This is because the distance traveled by the subject vehicle elongates during an interval to generate the still object maps.

Thus the vehicle control system 1 varies evaluation values depending on situations. The vehicle control system 1 can ensure the evaluation map stability (noise resistance), reflect an actual situation appearing in the still object map on the evaluation map with good response, and further improve the accuracy of road shape recognition.

In the embodiment, the front radar 3 functions as radar means; Step S310 as still object map creation means; Steps S360 and S390 as evaluation value setup means; Steps S370 and S400 as evaluation map creation means; Step S140 as road shape recognition means; Step S350 as left and right determination means; and Step S320 as grouping means.

(Modifications)

According to the embodiment, for example, the front radar 3 creates the evaluation map for road shape recognition. According to another possible construction, the front radar 3 may create the evaluation map and then transmit it to the intervehicular controlling ECU 30. The intervehicular controlling ECU 30 may recognize road shapes. According to still another possible construction, the front radar 3 may only detect objects. The intervehicular controlling ECU 30 and the other ECUs may perform processes after the object detection.

The above-mentioned embodiment performs the coordinate conversion from the still object map using polar coordinates to the evaluation map using coordinates during the evaluation map creation. According to another possible construction, the evaluation map may use polar coordinates. The polar coordinate may be used for road shape recognition. The conversion to coordinates may be performed during the road shape recognition.

The above-mentioned embodiment creates the left and right evaluation maps independently. According to another possible construction, a single evaluation map may be used to recognize road shapes.

According to the above-mentioned embodiment, the still object map is generated as a binary map. The still object map assigns 1 to each unit region containing a roadside object and assigns 0 to each unit region containing no roadside object. The still object map may not be binary when roadside objects are identifiable.

The above-mentioned embodiment adds an evaluation value to each unit region containing a roadside object and subtracts an evaluation value from each unit region containing no roadside object. The addition and the subtraction may be performed for the opposite unit regions.

The above-mentioned embodiment uses a result of road shape recognition to specify a preceding vehicle to be used for automatic cruise control and the like. For example, the result of road shape recognition may be used for the following control. The result of road shape recognition is used to find a curvature of the road ahead of the vehicle and automatically control the speed of the subject vehicle that enters a curve according to the curvature.

The above-mentioned embodiment uses the FMCW-based millimeter wave as a radar wave. Further, it may be preferable to use the other systems (such as CW (Continuous Wave) and pulse systems) as well as electromagnetic waves and laser beams having the other wavelengths, and the like.

The above-mentioned embodiment configures an evaluation values to be variable based on the speed of the subject vehicle and a distance between the subject vehicle and a unit region. The probability of being a roadside object may be found for each still object or still object group shown in the still object map. Evaluation values may be configured to be variable so that increasing the probability increases the evaluation value (additive value). The probability of being a roadside object may be calculated and evaluated by collating a roadside object position with a still object position for each unit region. For example, the roadside object position is estimated from road shape recognition results acquired up to the most recent cycle or from a curve curvature based on the subject vehicle steering angle. The still object position is found in a newly created still object map.

That is, a roadside object is assumed from the results (e.g., roadside object disposition states and road curvatures) of road shape recognition up to the most recent cycle. A position indicating strong possibility of existence of the roadside object is compared with the still object position indicated in the most recent still object map. Further, still object sizes may be evaluated. Specifically, an absolute evaluation value may be increased for the strong probability of being a roadside object.

In this case, the evaluation map reflects the still object or the still object group highly probably to be a roadside object with good response. It is possible to further improve the accuracy of road shape recognition based on the evaluation map.

The process to find the probability of being a roadside object functions as probability calculation means.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A road shape recognition apparatus in a vehicle having radar means for transmitting and receiving a radar wave to detect an object that reflects the radar wave, the apparatus comprising:
    still object map generation means for repeatedly generating a still object map indicating a relative position of a still object with respect to the vehicle by extracting the still object based on information indicative of a position and a speed of an object detected by the radar means, the still object map being segmentalized to define unit regions for the still object map;
    evaluation value setup means for, each time the still object map is generated, providing each unit region for the still object map with an evaluation value being positive for a unit region containing a still object and being negative for a unit region not containing a still object;
    evaluation map creation means for obtaining an accumulated evaluation value by totaling evaluation values repeatedly provided to each unit region for the still object map to thereby create an evaluation map, which is segmentalized to define unit regions for the evaluation map, wherein the unit regions for the evaluation map are individually associated with the unit regions for the still object map, such that a unit region for the evaluation map indicating high possibility of presence of the still object contains a large accumulated evaluation value; and
    road shape recognition means for recognizing a road shape based on an evaluation map created by the evaluation map creation means.

2. The road shape recognition apparatus according to claim 1,
    wherein the still object map generation means determines whether or not an extracted still object is a roadside object, and generates the still object map using a still object determined to be a roadside object.

3. The road shape recognition apparatus according to claim 2, further comprising:
    left-right determination means for determining a still object shown in the still object map belongs to a left end or a right end of a road,
    wherein the evaluation map creation means creates two types of independent evaluation maps, which are a left evaluation map for a still object determined to belong to the left end of the road and a right evaluation map for a still object determined to belong to the right end of the road.

4. The road shape recognition apparatus according to claim 3, further comprising:
    grouping means for grouping still objects shown in the still object map based on sizes of the still objects and positional relationship between the still objects,
    wherein the left-right determination means performs determination for each group of still objects grouped by the grouping means.

5. The road shape recognition apparatus according to claim 1,
    wherein the evaluation value setup means varies the evaluation value according to at least one of a speed of the vehicle and a distance to the unit region.

6. The road shape recognition apparatus according to claim 1, further comprising:
    probability calculation means for calculating probability of being a roadside object shown in the still object map,
    wherein the evaluation value setup means varies an evaluation value for a unit region containing the still object according to probability calculated by the probability calculation means.

7. The road shape recognition apparatus according to claim 1,
    wherein the road shape recognition means recognizes a road shape assuming that a roadside object exists in a unit region for the evaluation map assigned with an accumulated evaluation value greater than or equal to a threshold value for the evaluation map.

8. A method used to recognize a road shape for a vehicle having a radar for transmitting and receiving a radar wave to detect an object that reflects the radar wave, the method comprising:
    repeatedly generating a still object map indicating a relative position of a still object with respect to the vehicle by extracting the still object based on information indicative of a position and a speed of an object detected by the radar, the still object map being segmentalized to define unit regions for the still object map;
    providing each unit region for the still object map with an evaluation value being positive for a unit region containing a still object and being negative for a unit region not containing a still object, each time the still object map is generated;
    obtaining an accumulated evaluation value by totaling evaluation values repeatedly provided to each unit region for the still object map to thereby create an evaluation map, which is segmentalized to define unit regions for the evaluation map, wherein the unit regions for the evaluation map are individually associated with the unit regions for the still object map, such that a unit region for the evaluation map indicating high possibility of presence of the still object contains a large accumulated evaluation value; and
    recognizing a road shape based on the created evaluation map.

9. A road shape recognition apparatus in a vehicle having a radar for transmitting and receiving a radar wave to detect an object that reflects the radar wave, the apparatus comprising:
    a still object map generation unit that repeatedly generates a still object map indicating a relative position of a still object with respect to the vehicle by extracting the still object based on information indicative of a position and a speed of an object detected by the radar, the still object map being segmentalized to define unit regions for the still object map;
    an evaluation value setup unit that provides each unit region for the still object map with an evaluation value being positive for a unit region containing a still object and being negative for a unit region not containing a still object, each time the still object map is generated;

an evaluation map creation unit that obtains an accumulated evaluation value by totaling evaluation values repeatedly provided to each unit region for the still object map to thereby create an evaluation map, which is, segmentalized to define unit regions for the evaluation map, wherein the unit regions for the evaluation map are individually associated with the unit regions for the still object map, such that a unit region indicating high possibility of presence of the still object contains a large accumulated evaluation value; and a road shape recognition unit that recognizes a road shape based on an evaluation map created by the evaluation map creation unit.

* * * * *